Dec. 1, 1936. F. L. O. WADSWORTH 2,062,623
ROTARY TURRET SHEAR MECHANISM
Original Filed Feb. 3, 1934 3 Sheets-Sheet 1
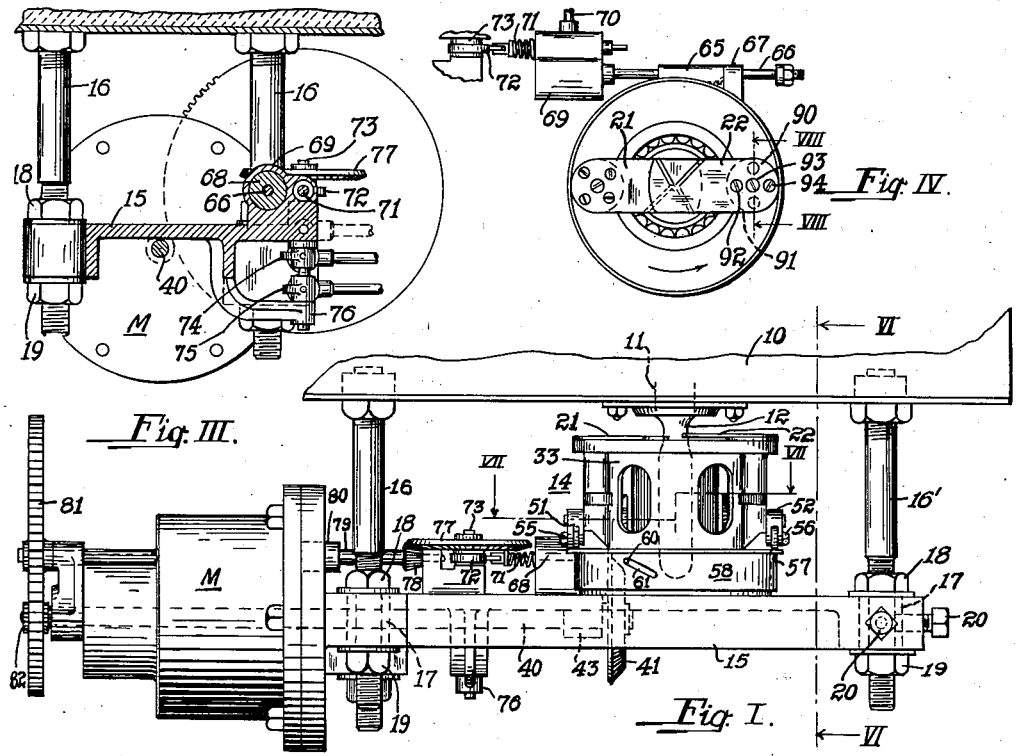
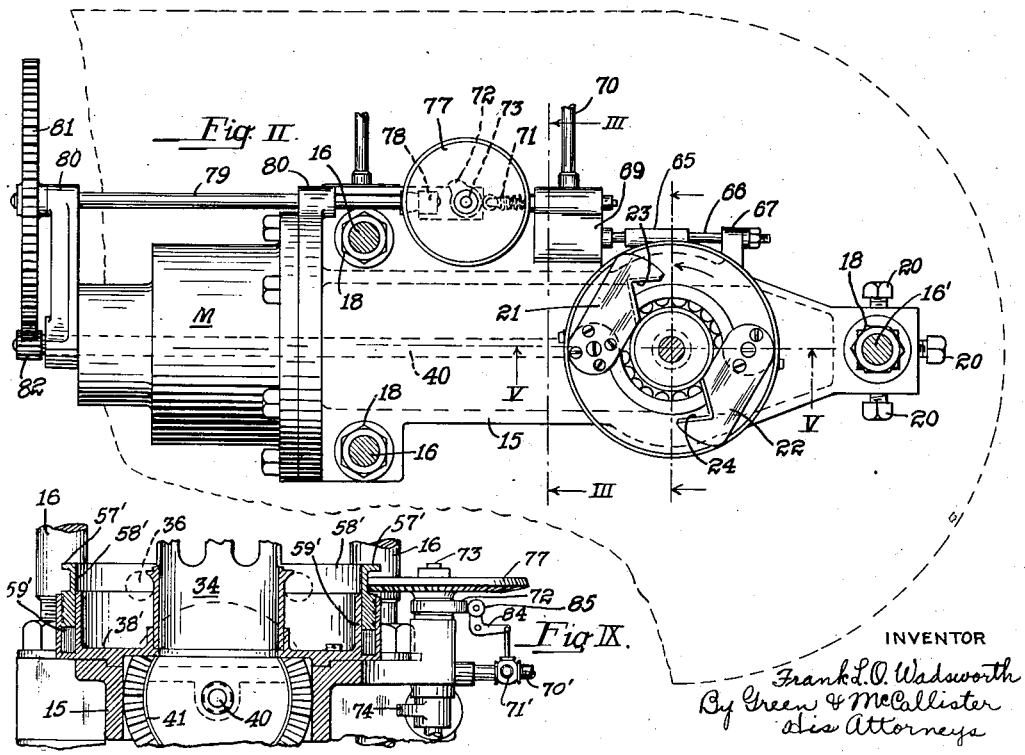
INVENTOR
Frank L. O. Wadsworth
By Green & McCallister
his Attorneys Dec. 1, 1936.  F. L. O. WADSWORTH  2,062,623
ROTARY TURRET SHEAR MECHANISM
Original Filed Feb. 3, 1934   3 Sheets-Sheet 2
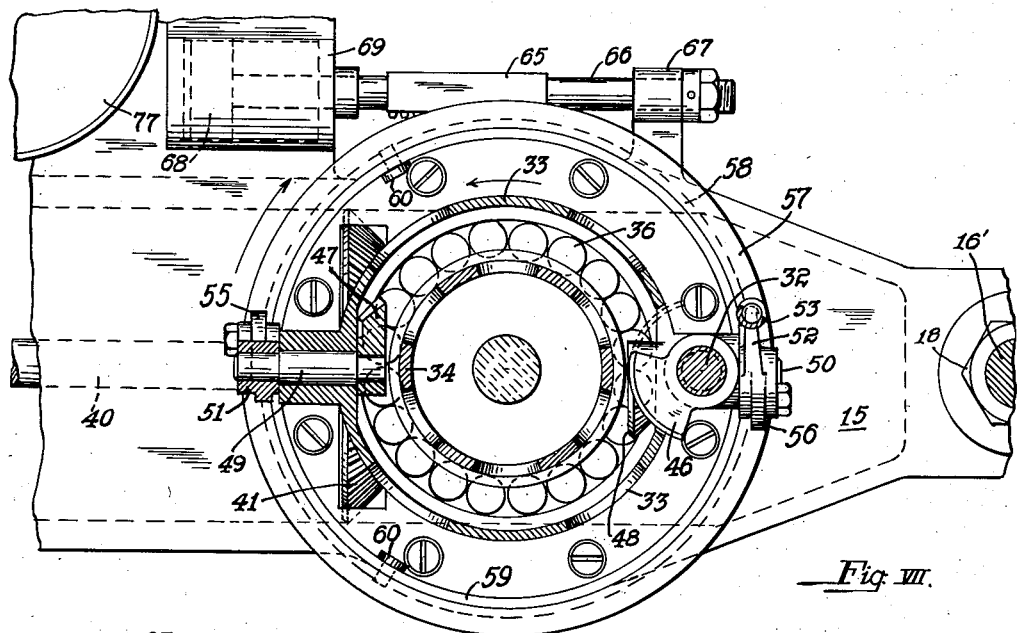
Fig. VII.
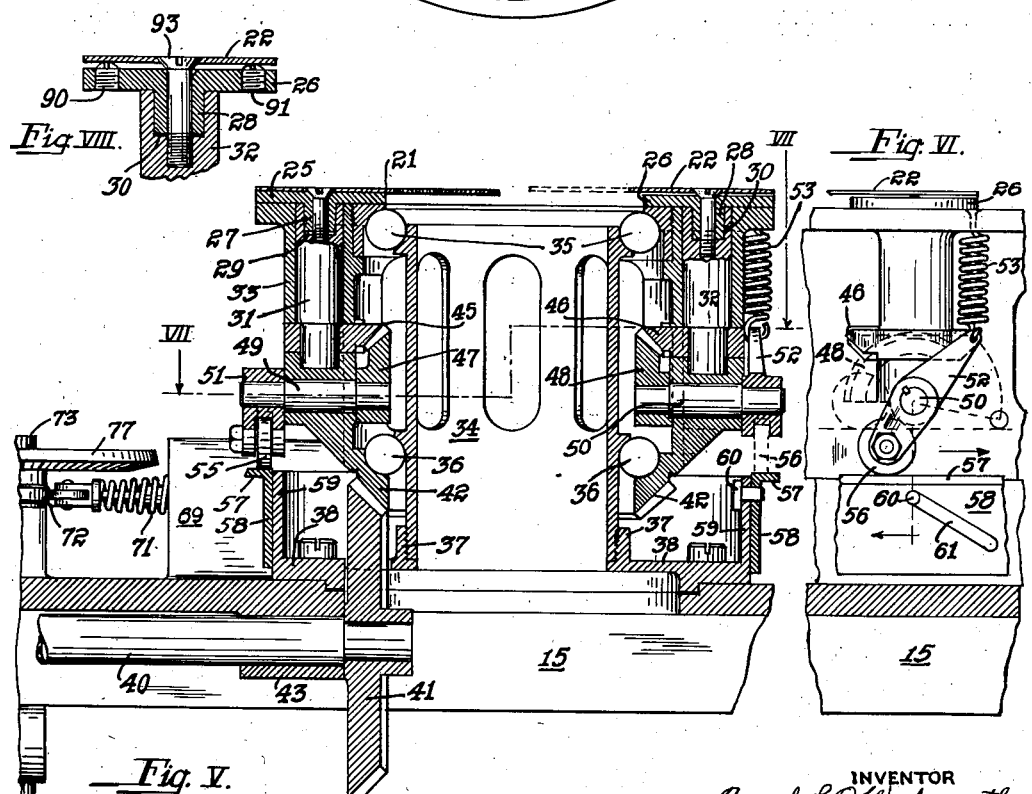
Fig. VIII.  Fig. VI.
Fig. V.
INVENTOR
Frank L. O. Wadsworth
By Green & McCallister
His Attorneys Dec. 1, 1936. F. L. O. WADSWORTH 2,062,623
ROTARY TURRET SHEAR MECHANISM
Original Filed Feb. 3, 1934 3 Sheets-Sheet 3
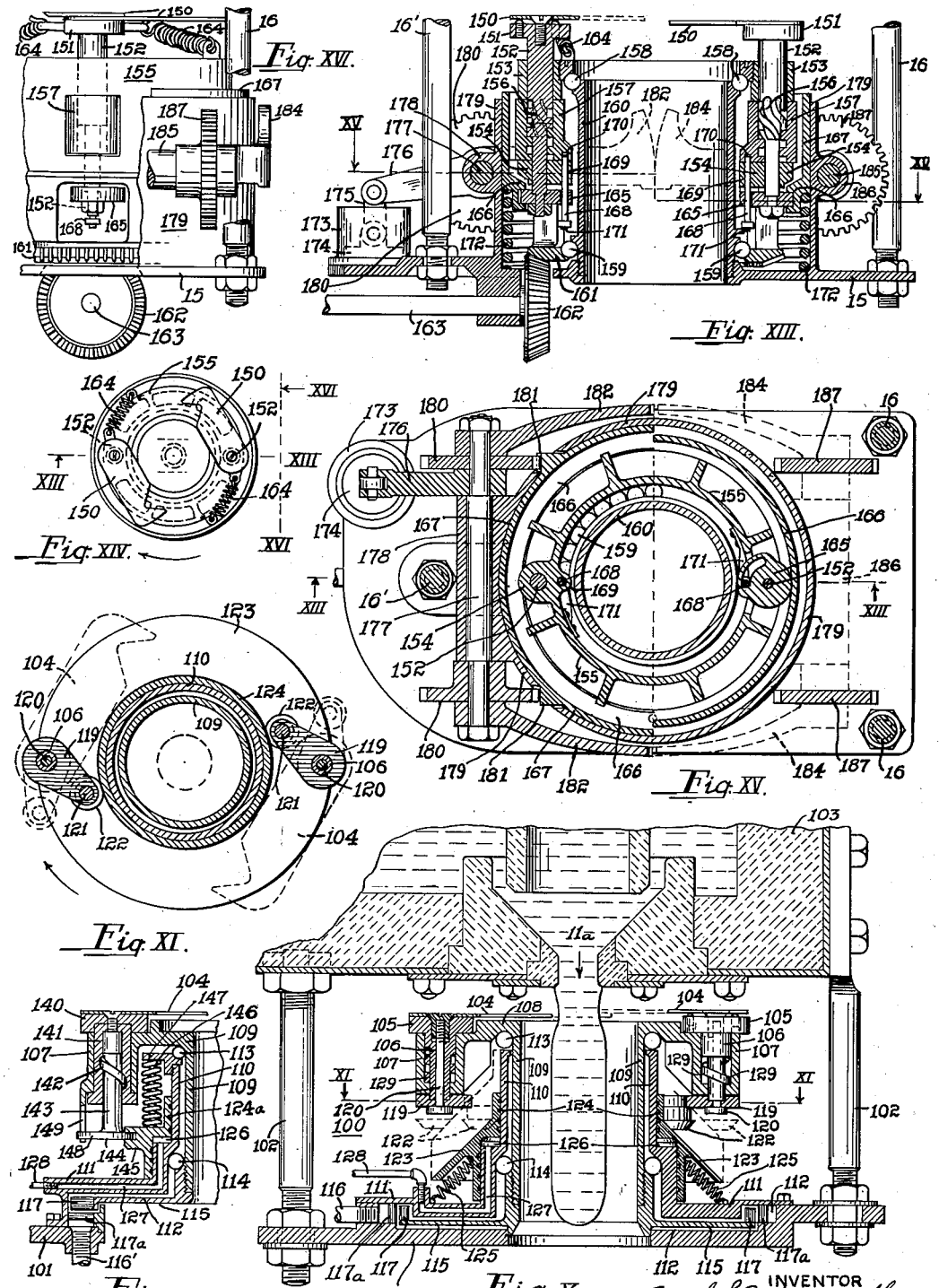

Patented Dec. 1, 1936

2,062,623

UNITED STATES PATENT OFFICE 2,062,623

ROTARY TURRET SHEAR MECHANISM

Frank L. O. Wadsworth, Pittsburgh, Pa., assignor to Ball Brothers Company, Muncie, Ind., a corporation of Indiana Application February 3, 1934, Serial No. 709,597
Renewed September 5, 1935

22 Claims. (Cl. 49—14)

This invention relates to the art of severing a stream of molten glass and in particular, to an improved method and apparatus for severing such a stream into individual gobs or mold charges as it flows from a forehearth or boot on the side of a glass melting tank or furnace.

Molten glass is usually fed in stream-like formation through a submerged orifice in the bottom of the forehearth and severed mechanically into successive individual mold charges or gobs. The shears employed for cutting the stream into separate charges usually comprise a pair of shear blades mounted below the forehearth and which approach the stream from opposite sides thereof and pass over each other to the extent necessary to cut the stream. With cutters of this general type, there is a tendency for the glass flowing from the forehearth to pile up on the shears, unless the flow is interrupted at the time of severance, which results in distorting and chilling the stub end of the stream and in overheating the shear blades themselves. Also, there is a tendency for the upper blade to push the lower end of the stub in the direction in which the blade advances, and thereby further distort the end of the stub while the lower blade pushes the upper end of the severed gob in the opposite direction, which tends to throw the gob out of the normal vertical line of the stream and to impart a twist to the gob which is detrimental to the finished ware.

It is the general object of my invention to provide an improved method and apparatus for severing a continuously flowing stream of molten glass or similar plastic material, into successive individual mold charges or gobs without interrupting the flow, which will overcome the objections set forth above and which will sever the stream in such a manner that the upper end of the severed gob will not be distorted and will not be deflected or moved laterally with relation to the vertical axis of the flowing stream. That is, the upper sheared end of the gob or mold charge will be smoothly rounded and the shear mechanism will not distort or displace the cut or stub end of the stream, although there is a tendency for the glass to pile up on the blades.

For this purpose the shear blades of my improved mechanism are continuously rotated as the cut is made. The shear blades are mounted on a turret revolving at a relatively high speed and as the blades approach one another from opposite sides of the stream and cut into the glass, they are continuously rotating about the axis of the stream whereby the cutting edges act upon the stream in a manner similar to a cutter in a wood turning lathe and as a result, there is no pushing of the upper end of the gob out of the vertical line of the issuing stream and both the lower end of the stub and the upper end of the gob are rounded whereby a gob symmetrical about its vertical axis is secured. A broad object of the invention is therefore to accomplish the severance in such a way as to actually shape the upper end of the charge and the lower end of the remaining stub, or from a procedural standpoint the object is to accomplish a severance by a cutting action as distinguished from the usual pinch off action of ordinary shears.

These and other objects which will appear to those skilled in this particular art are accomplished by means of this invention, an embodiment of which is described in the following specification and illustrated in the accompanying drawings, wherein:

Figure I is a view in side elevation of my improved turret shear suspended from the bottom of the forehearth of a glass melting tank or furnace;

Fig. II is a top plan view of my improved shear;

Fig. III is a view taken on lines III—III of Fig. II;

Fig. IV is a partial plan view showing the shear blades in closed position;

Fig. V is an enlarged view in vertical section taken on line V—V of Fig. II;

Fig. VI is an enlarged view in elevation taken on line VI—VI of Fig. I and showing the blade operating mechanism;

Fig. VII is a section taken on line VII—VII of Figs. I and V;

Fig. VIII is an enlarged section taken on line VIII—VIII of Fig. IV;

Fig. IX is a partial view in section illustrating a modification of my invention;

Fig. X is a view in section of another exemplification of my invention;

Fig. XI is a section taken on line XI—XI of Fig. X;

Fig. XII is an enlarged sectional view showing another exemplification of the shear blade mounting;

Fig. XIII is a vertical section of an apparatus illustrating another modification of my invention;

Fig. XIV is a plan view of the apparatus shown in Fig. XIII;

Fig. XV is a sectional view taken on line XV—XV of Fig. XIII; and

Fig. XVI is a partial end view of the apparatus having portions thereof broken away for convenience of illustration.

In the drawings, my invention is illustrated in connection with a forehearth or boot 10 which is attached to the front of a glass melting tank or furnace (not shown) and has an orifice 11 in the bottom thereof through which molten glass is flowing in a stream 12 either by the action of gravity or of gravity and some mechanical accelerating device such as a reciprocating plunger, an air bell or the like. The stream 12 flowing through the orifice 11 is cut or severed into individual gobs or mold charges by my improved severing mechanism, designated in its entirety as 14, which is positioned below the forehearth 10 and has its vertical axis in the line of flow of the stream 12.

The shearing mechanism 14 is carried on a frame or base 15 which is suspended from rods 16—16—16' secured to and depending from the bottom of the forehearth 10. The rods 16—16—16' extend through openings 17 in the frame; and in order that the frame 15 may be adjusted vertically to raise and lower the shear mechanism 14 relative to the orifice 11, it is secured to the rods 16—16' by means of upper and lower nuts 18—19 threaded on the rods 16—16'.

To permit the shear mechanism to be adjusted horizontally and to be tilted sideways and endwise, the openings 17 are larger than the diameter of the rods 16—16' and a connection similar in action to a universal joint is established between the rods and the frame. Set screws 20 are threaded through the front end of the frame and are adapted to engage with the rod 16' for the purpose of adjusting the frame and for holding it in place until the nuts 18—19 can be tightened.

The shearing mechanism 14 comprises a pair of opposed shear blades 21 and 22 the cutting edges of which may be straight or of the usual re-entrant V or cat's-eye type. The shear blades 21 and 22 are mounted on plates 25 and 26 which are provided with depending studs 27 and 28 that are adapted to be received in recesses 29 and 30 formed in the upper ends of upright shafts 31 and 32 journaled in a rotating turret sleeve 33 on diametrically opposite sides thereof.

The turret 33 surrounds an upright sleeve or cylindrical member 34 and is rotatably supported thereon by ball bearings 35 and 36. The lower end of the cylindrical member 34 is threaded into a flange 37 of a base member 38 which is bolted to the frame 15. The frame 15 is so adjusted on the rods 16 that the axis of the cylindrical member 34 corresponds with the axis of the stream of molten glass flowing from the orifice 11.

The turret 33 is continuously driven at a relatively high speed of from 1500 to 2500 R. P. M. in a counterclockwise direction (see arrow, Figs. II and VII) by a suitable motor, in the present embodiment a variable speed motor M, the motor shaft 40 of which has a bevel gear 41 on one end thereof which meshes with an annular bevel gear 42 secured to the bottom of the turret sleeve 33. The motor M is bolted to the frame and the end of the motor shaft 40 is journaled in bearing 43 formed in the frame 15.

From the construction so far described, it is apparent that the shear blades 21—22, which are normally in the position shown in Fig. II, are continuously rotating about the stream of glass as an axis and in order to cut the stream of glass into individual gobs or mold charges, the shear blades are periodically advanced toward each other and approach the stream of glass from opposite sides thereof while the rotation of the turret 33 is continued. In order to close the shear blades and sever the stream, means are provided for turning the upright shafts 31—32 and moving the blades 21 and 22, carried thereby, into contact with the flowing glass.

To turn the upright shafts 31 and 32, segment gears 45 and 46 are secured to the bottom thereof respectively, which in turn mesh with gear segments 47 and 48 secured to the inner ends of shafts 49 and 50 journaled in the turret sleeve 33. Keyed to the outer ends of shafts 49 and 50 are rocker arms 51 and 52 each of which has one end thereof connected to the turret by means of a coil spring 53 while the opposite ends are bifurcated for the purpose of receiving rollers 55 and 56 therein which ride on the flange 57 of an annular collar 58 rotatably mounted on an annular flange 59 extending upwardly from the base member 38. The collar 58 is supported on a series of pins 60 which are carried by the flange 59 and which engage with slots 61 cut in the collar 58 at an angle to the vertical axis thereof.

When the shear blades are to be closed, the collar 58 is turned relative to the flange 59 which raises the collar as the slots 61 ride up on the pins 60. This upward movement of the collar 58 turns the rocker arms 51 and 52 and the shafts 49—50 to which the rocker arms are keyed. The turning movement of the shafts 49—50 is imparted to the shafts 31—32 through the gear segments 45—47 and 46—48, respectively, which advances the blades 21—22 to their closed position (Fig. IV).

To turn the collar 58 in a clockwise direction, when the shears are to be closed, teeth (none shown) are formed in the side of the collar which are engaged by a rack bar 65 carried on a piston rod 66. The outer end of the piston rod 66 is carried by a bearing 67 and the other end is connected to a piston 68 slidably mounted in a cylinder 69 on the frame 15. The cylinder is supplied with air through a pipe 70 leading from a suitable source of air under pressure.

In order that the collar 58 will be raised and the shear blades 21 and 22 moved to closed position to sever the flowing stream at the proper time in respect to the operation of the glass accelerating or feeding mechanism (none shown) the admission of air to the cylinder 69 is controlled by a two-way valve 71 which is operated by a cam 72 carried on a timer shaft 73 which may also be provided with cams 74 and 75 for controlling the operation of the feeder and forming mechanisms. The timer shaft 73 is journaled in bearings 76 on the frame 16 and is continuously driven through a bevel gear 77 secured to one end of the shaft 73 and a pinion 78 secured to the end of a shaft 79. The shaft 79 is journaled in bearings 80 on the frame 15 and is driven from the motor shaft 40 through a gear 81 and a pinion 82.

In operation, the frame 15 is first adjusted on the rods 16 so that the axis of the sleeve 34 coincides with the line of flow of the stream of molten glass 12 passing through the orifice 11. The motor M is then started which drives the turret 33 carrying the shear blades 21—22 and the timer shaft 73. The turret is rotating continuously at a relatively high speed about the stream 12 and the blades are held in their open position by the springs 53 aided by centrifugal force. When the stream is to be severed, the cam 72 on the timer shaft 73 operates the valve 71 to admit compressed air to the cylinder 69 from the line 70; and the piston rod 66 carrying the rack bar 65 is moved to the position shown in Fig. IV which turns the collar 58 and causes it to travel upwardly on the pins 60. As the collar 58 is raised, it turns the rocker arms 51—52 and the rocker shafts 49—50 which, in turn, through the gears 45—47 and 46—48 turn the shafts 31—32 which move the blades toward and through the stream of molten glass 12. Thus the stream of glass is periodically severed into successive mold charges, or gobs. As soon as the cut is completed the valve 71 is released, and the cylinder 69 is opened to the atmosphere; thus permitting the piston to be retracted, and the associated parts to be returned to their original positions by the joint effect of the springs 53 and the centrifugal forces acting on the shear blades 21—22.

While the shear blades may be closed or made to meet at the center of the stream 12 at any desired speed, I prefer to so control the admission of air to the cylinder 69 that the shear blades will not meet at the center of the stream 12 until the turret 33 has made two or three complete revolutions after the blades have first come in contact with the stream of molten glass. By thus controlling the closing movement of the continuously rotating shear blades, I eliminate the tendency of the cutting edges to pinch and distort the plastic material during the severing operation; and as a result, I obtain a clean circumferential cut with symmetrically rounded contours on both the upper end of the severed gob and the lower end of the stub; and the latter is not deformed or displaced laterally even when there is a "piling up" of glass on the closed blades.

While the turret may be rotated at any desired speed, I prefer to have it rotating at approximately 1500 R. P. M., so that the shear blades being in contact with the glass during two or three revolutions, will complete the cutting operation in about one-tenth of a second. If less cutting time is desired the turret can be speeded up and the blade actuating mechanism adjusted to close the shears in any desired number of revolutions of the turret.

In order to insure a clean severance of the stream when the blades 21—22 are closed, I provide means for adjusting the upper blade 22 relative to the lower blade 21 which is rigidly mounted on the plate 25. To secure this adjustment, the plate 26 (Fig. VIII), supporting the blade 22 is provided with two threaded studs 90—91, which are positioned on a line transverse to the axis of the blade 22 and upon which the blade is supported. The blade is held down on the studs by means of three screws 92—93—94 (Fig. IV) which are threaded into openings formed in the plate 26 and shaft 32 in line with the axis of the blade 22. From this construction it is obvious that both the height and the inclination of the blade 22 may be adjusted to any desired position with respect to the fixed blade 21, by a proper setting of the stud and screw elements 90—91—92—93—94; and it is also apparent that the blade 22 may be made slightly concavo-convex by the tightening of the holding screws 92—93—94.

In Fig. IX I have shown a slightly modified arrangement for advancing the shear blades into cutting position. In this modification the base member 38' is provided with two concentric flanges 59'—59' forming an annular cylinder in which an annular piston 58' is slidably mounted. The piston 58' has an outwardly projecting flange 57' on its upper end for receiving the rollers 55—56 of the rocker arms 51—52. To turn the rocker arms 51—52 and close the shear blades in the manner heretofore set forth, a motive fluid, such as compressed air, is admitted to the cylinder 58' through a pipe 70', having a valve 71' positioned therein, which, when closed, connects the cylinder 59' to the atmosphere and when opened, admits compressed air to the interior of the cylinder which raises the piston 58' and closes the shear blades.

The valve 71' is operated by a bell crank 84 which is pivoted to the frame 15 and has one end connected to the stem of the valve 71' while the other end is provided with a roller 85 that is engaged by the cam 72 on the timer shaft 73.

Figs. X to XII, inclusive, illustrate another embodiment of my invention. In this construction, the shear mechanism, designated in its entirety as 100, is provided with a base member 101 which is suspended on rods 102 depending from the bottom of a forehearth 103 in the manner heretofore described in connection with the constructions illustrated in Figs. I to IX, inclusive.

The shear mechanism 100 comprises a pair of opposed shear blades 104—104 which are mounted on the enlarged heads, 105—105, of upright shafts 106—106. The shafts 106—106 are rotatably mounted in diametrically opposite bearing bosses, 107—107, that are carried by a flanged head 108 on the upper end of an upright tubular member 109 which is rotatably mounted in a concentric cylindrical sleeve 110. The lower end of the sleeves 110 is provided with an outwardly projecting flange 111 which is bolted to the base 101 and spaced therefrom to form a chamber 112 therebetween. The associated elements 107—108—109, are mounted to rotate freely about the supporting sleeve 110 on the ball bearings 113—114.

The lower end of the sleeve 109 is detachably secured to a turbine rotor 115 which is housed in the chamber 112, and which is continuously driven at a high speed by a suitable motive fluid, such as compressed air, that is introduced into the rotor chamber through a pipe 116, and is directed against the vanes 117 of the revolving turbine 115 by the fixed blades 117a. The tubular sleeve 109 carrying the opposed shear blades 104—104, forms the turret member which is continuously rotated about the axis of the flowing stream of molten glass which is discharged through the delivery orifice 11a in the forehearth 103.

In order to move the shear blades 104—104 toward and through the stream of molten glass, in order to sever the latter into individual mold charges, the lower ends of the shafts 106—106, carrying the shear blades 104—104 are provided with arms 119—119 which are secured thereto by bolts 120—120. The outer ends of the arms 119—119 have stub shafts 121—121 depending therefrom, on which beveled rollers 122—122 are mounted. These rollers 122—122 bear against the conical head 123 of a sleeve 124 which is slidably mounted on the outer surface of the supporting sleeve 110, and which is normally held in its lower position relative to the member 110 by the tension springs 125—125.

The engaging surfaces of the concentric sleeve members 110 and 124 are offset intermediate of their length to form therebetween an annular cylinder 126, which is connected by a passageway 127 to a pipe 128 that leads to a suitable source of compressed air, or other motive fluid.

The admission of fluid to the cylinder 126 to raise the sleeve 123—124 may be controlled in any suitable manner (none shown) such as by the cam operated valve illustrated in Fig. IX.

When it is desired to close the shear blades 104—104, for the purpose of severing the flowing stream of glass, compressed air (or other suitable fluid under pressure) is introduced into the cylinder 126 to raise the sleeve 124 and as the conical head 123 moves upwardly, the rollers 122—122 are moved outwardly, thereby turning the arms 119—119, and the shafts 106—106, and swinging the shear blades toward each other, so that they approach and enter the stream of glass from opposite sides thereof. Since the turret 109 in which these blades are mounted is continuously rotating at a high speed, the cut off is made while the blades are turning about the line of flow of the stream, and, as a result, the pinching or distortion of the stream by the cutting edges is substantially eliminated, and symmetrical mold charges with smoothly rounded ends are secured. To return the shear blades 104—104 to their open position, helical springs 129—129 are coiled around the reduced end portions of the shafts 106—106, and each spring has one end attached to the shaft 106 and the other end secured to the lower end of the corresponding bearing boss 107. These springs, which oppose the closing of the shears, quickly retract the blades when the cylinder 126 is opened to the atmosphere and the sleeve member 124 is returned to its lowermost position by the action of the springs 125.

In Fig. XII I have shown a structural modification of the mechanism which is illustrated in Figs. X and XI, and which differs therefrom, primarily in the manner of supporting and rotating the shear blades. In this modification each of the shear blades 104 is secured to a head 140 which is mounted on the closed end of a rotatable sleeve 141 journaled in the bearing boss 107, that is carried by the continuously rotating turret 109. The inner surface of the sleeve 141 is provided with a helical groove which is engaged by a helical thread 142 on an upright bolt 143 having a head 144 which is supported in a grooved flange 145 of the annular sleeve piston 124a. The piston 124a is slidably mounted on the member 110 and may be raised relatively to the latter by compressed air admitted to the annular cylinder 126 through the passageway 127 and air line 128. The piston 124a is normally held in its lowermost or retracted position by a concentrically disposed series of compression springs, 146, positioned between a flange 147 that is secured to the upper end of the member 110 and the upper face of the flange 145.

In order that the sleeve 141 carrying the blade 104 may be turned to advance the blade towards the stream of glass, when the member 124a and the bolt 143 are raised, the head 144 of the bolt 143 is provided with an outwardly extending arm 148 which rides in a slotted extension, 149, of the bearing member 107, and prevents the bolt from turning during its vertical travel with the member 124a. As a result of holding the bolt 143 against turning, the sleeve 142 will be rotated by its helical thread connection with the bolt 143; and the blades 104 will be moved to closed position when the member 124a is raised, and will be returned to their open position when it is moved back by the springs 146. When it is desired to sever the flowing stream of glass, compressed air is admitted to the cylinder 126 through the pipe 128 and passageway 127 thereby raising the piston 124a and the bolts 143 and rotating the sleeves 142, and the attached shear blades 104 in a clockwise direction (see Fig. XI). As soon as the severance has been effected, the cylinder 126 is opened to the atmosphere and the springs 146 return the piston 124a and the threaded bolts 143 to their lowermost positions; thereby rotating the elements 142—140—104 in a counterclockwise direction (to open position); this return movement being assisted by the action of centrifugal forces on the revolving shear blades. The admission of air to the cylinder 126 is controlled in any suitable manner such as by a valve disposed in the line 128, and operated by a timer cam such as is shown in Figs. II or IX.

Figs. XIII to XVI, inclusive, illustrate another embodiment of my present invention in which the shear blades have a combined transverse and axial movement as well as a rotary movement during the severing operation. In this construction, the shear blades 150—150 are mounted on the enlarged heads 151—151 of upright shafts 152—152 which are rotatably and slidably journaled in upper and lower bearing bosses 153—153 and 154—154, that are formed on diametrically opposite sides of a turret sleeve 155. The lower ends of the shafts 152—152 are of reduced size and are provided with square cut helical threads 156 which are engaged in helical grooves cut in the inner surfaces of sleeve nuts 157—157 that are positioned between the upper and lower journals 153—153 and 154—154, the purpose of which will be more fully explained hereinafter.

The turret 155 is rotatably supported, by upper and lower ball bearings 158—159, on a vertical sleeve 160 which is secured at its lower end to the frame 15, and is continuously driven at high speed to rotate the shear blade assembly about the axis of the flowing stream of molten glass. To drive the turret 155, the lower end thereof is provided with a bevel gear 161 which meshes with a bevel gear 162 on the end of a shaft 163 driven by a suitable variable speed motor (none shown).

When the stream is to be severed, the shear blades, which are normally held in their open position by spring members 164—164 (whose ends are attached to the enlarged heads 151—151 and the rotating turret sleeve 155) are moved inward toward each other by the downward movement of the shafts 152—152, so that the shear blades have a combined transverse and axial "dropping" movement as they cross each other in the line of flow of the molten glass.

To secure this conjoint and concurrent transverse and axial movement of the cutting elements 150—150, the lower ends of the shafts 152—152, below the sleeve journals 154—154 are provided with segmentally slotted heads 165—165, the outer edges of which are engaged by the circumferentially grooved flange 166, projecting inwardly from the adjoining surface of an annular sleeve 167 that surrounds the revolving turret sleeve 155. The sleeve 167 is mounted for vertical movement, relative to the turret 155, and as it moves up and down, it carries with it the heads 165—165 of the shafts 152—152.

To turn the shafts 152—152, during their downward movement and thus advance the shear blades toward each other, dowel pins 168 are provided for releasably locking the sleeve nuts 157—157 against turning relatively to the shafts 152—152, so that, as the shafts move downward through the sleeves, the helical thread connection therebetween will cause the shafts to turn in a counterclockwise direction (see Fig. XIV) in their bearings. The pins 168—168 are mounted in slots in the heads 165—165 and extend through bearings 169—169 in the lower journal elements 154—154, to engage dowel openings 170—170 in the lower ends of the sleeve nuts 157—157. The pins are normally held in their elevated position (as shown in Fig. XIII) by means of leaf springs 171—171 positioned under the lower ends of the pins.

In order to return the shear blades 150—150 to their open position as soon as the severance has been made, and before the shears move upward again, the downward movement of the sleeve 167 is continued until the lower face of the heads 165—165 engage the heads of the pins 168—168, and move them downwardly, against the resistance of the leaf springs 171—171, to withdraw the pins from the dowel openings 170—170 in the sleeve nuts 157—157. As soon as the pins are disengaged from the sleeve nuts, the springs 165—165 retract or open the shear blades by concurrently turning the shafts 152—152 and the released sleeve nuts 157—157. After the blades have been opened, the collar 167 is moved upwardly, or returned to its original position, carrying with it the shear blade shafts 152—152. Since the springs 164—164 resist any turning of the shafts during their upward movement the sleeve nuts 157—157 are now rotated relatively to the shafts until the spring-pressed pins 168—168 are again engaged with the openings 170—170 and the parts are reset for the next severing operation.

The sleeve 167, which is normally held in its upper position by a compression spring 172, may be periodically moved to its lowermost position (to impart the combined transverse and axial movement to the shear blades and cause a severance of the stream of molten glass) in any suitable manner. In the construction illustrated in Figs. XIII to XVI, inclusive, the means for effecting this movement comprises a single acting cylinder 173 which is supplied with compressed air at regular timed intervals through a pipe (not shown) having a cam operated valve therein of the type shown in Figs. II or IX for alternately connecting the interior of the cylinder with atmosphere, and a source of compressed air. The cylinder 173 has a vertically movable piston 174 therein which is coupled by the connecting rod 175 to a rocker arm 176 on the horizontal shaft 177. The shaft 177 is journaled in a bearing 178 on the outer surface of an annular sleeve 179 which extends upwardly from the frame 15 and slidably engages the sleeve 167. The shaft 177 carries pinions 180 which mesh with vertically extending rack bars 181 formed on the sides of the sleeve 167.

In order that the sleeve 167 will be moved up and down without binding in the sleeve 179, the shaft 177 is preferably provided with gear segments 182—182 secured to the opposite extremities thereof which mesh with cooperating gear elements 184—184 that are secured to the ends of a second cross shaft 185. The shaft 185 is journaled in a bearing 186, on the opposite side of the sleeve from the bearing 178, and has pinions 187 secured thereto which mesh with two additional rack bars (not appearing in the lower plane section at the right of Fig. XV) on the side of the sleeve 167.

From the preceding description, it is apparent that the turret 155 carrying the shear blades 150 is constantly rotated at a high speed. When the blades are to be closed to sever the stream of glass, air is admitted to the cylinder 173 which raises the piston 174 and the arm 176, thus rotating the co-engaged shafts 177 and 185 in opposite directions. The concurrent rotation of the shafts 177—185 and of the connected pinions 180—180—187—187, moves the sleeve 167 downwardly against the tension of the spring 172. This imparts a corresponding movement to the shafts 152—152, and causes them to rotate synchronously in a counterclockwise direction by reason of the engagement of their threaded peripheries with the stationary sleeve nuts 157—157. This rotation advances the blades to cutting position while the downward movement thereof is continued, so that the shears have a concurrent transverse and axial "dropping" movement as the severance is effected.

The shears 150—150 are adapted to be completely closed before the sleeve 167 has reached the downward limit of its travel; and after the cut off has been made, the continued downward movement of the sleeve pulls the pins 168 from the openings 170—170 in the sleeve nuts 157—157. As soon as the pins have been withdrawn, the springs 162 turn the shafts 152—152 in a clockwise direction, and return the shear blades to their open position (Fig. XIV).

The cylinder 173 is then connected to atmosphere, which permits the spring 172 to raise the sleeve and return it to its uppermost position. As the sleeve is raised, the shafts 152—152 are also raised and the helical threads 156 cause the sleeve nuts to rotate until the openings 170 are again in registry with the pins 168. The pins are forced into the openings by the spring members 171 and lock the sleeves against further rotation and reset the shear mechanism for the next cutting-off operation.

From the foregoing disclosure of various illustrative embodiments of my invention, it is apparent that I have provided a shear mechanism for severing a continuously flowing stream of molten glass into successive, individual mold charges, which is adapted to effect the severance while the blades are rotating about the line of flow of the stream as an axis; and when the movements are so timed that the severance is not completed until the turret carrying the shear blades has made one or more complete revolutions, the flowing stream of soft plastic material may be cut in two without any lateral pinching together of its sides—producing what is known as a "fish tailed" cut—and the severed ends will be smoothly and symmetrically rounded by the action of the rapidly revolving shear elements.

By revolving the shear blade assembly at a relatively high speed around the suspended mass of molten material while they are moved into contact with and into the mass, the mass is severed by a spinning action, i. e., it is subjected to the spinning action of at least one peripherally applied force which, during its application to the mass, is not only moved in a substantially radial direction with relation to the stream-like mass but is also moved around the mass so that its point or points of application to the mass is continuously moved to different positions peripherally of the mass. Thus it is apparent that the mass is in fact severed by a spinning or it might be said, by a displacing action but lateral displacement or objectional distortion of the mass is avoided because the radial action of the severing forces acts progressively around the mass and only acts on small increments of the mass at a time although the rapidity of the incremental action is such as to approximate a substantially instantaneous shearing of the stream. In the last described embodiment, the spinning cut is accomplished under such conditions that the cutting force not only moves radially and peripherally of the stream, but also with the stream It is also apparent that a stream severed with my improved mechanism will not be thrown out of the normal line of flow and that there will be no localized surface deformation or cooling of the soft hot material.

It will be further apparent that by making use of a combined rotary transverse and axial ("dropping") movement of the shear blades a constantly flowing stream of soft molten material may be severed at any desired point in the line of flow (e. g., either close to the delivery orifice or at a distance below that orifice), without the slightest interruption or retardation of the continuously moving stream, (or any "piling up" of the material on the closed shear blades); and that, in its broader aspects, the mode of operation herein disclosed—and the several forms of mechanism designed for the practice of my present invention—present various other obvious advantages that will now be readily appreciated by those skilled in this art.

I desire it to be understood that I have devised various shearing structures, and various shearing procedures for severing a continuously flowing stream of molten glass to produce well formed mold charges and in which the shear blades move downwardly with the stream and that such mechanisms and procedures form the subject matter of and are claimed in copending applications for patents and structurally and functionally distinguish from the features herein claimed.

While I have described in detail certain exemplifications of my invention, it is understood that I do not wish to limit myself thereto, and that various features of my improvements may be employed, in whole or in part, in other forms of construction without departing from the spirit of the disclosure and the scope of the appended claims.

What I claim as new and desire to secure by Letters Patent is:

1. A shear mechanism for severing a continuously flowing stream of molten glass comprising a sleeve surrounding said stream of glass and having its axis on the line of flow thereof, a turret rotatably mounted on said sleeve, a pair of vertically extending shafts turnably mounted on opposite sides of said turret, a shear blade secured to the upper end of each of said shafts, means for continuously rotating said turret, and means for periodically turning said shafts to advance said blades into the stream of glass.

2. A shear mechanism for severing a continuously flowing stream of molten glass comprising a sleeve surrounding said stream of glass and having its axis on the line of flow thereof, a turret rotatably mounted on said sleeve, a pair of vertically extending shafts journaled in said turret, a shear blade secured on the upper end of each of said shafts, means for continuously rotating said turret, a rocker shaft geared to the lower end of each of said vertical shafts, and means for periodically actuating said rocker shafts to turn said vertical shafts and move said shear blades to cutting position.

3. A shear mechanism for severing a continuously flowing stream of molten glass comprising a sleeve surrounding said stream of glass and having its axis on the line of flow thereof, a turret rotatably mounted on said sleeve, a pair of vertically extending shafts rotatably mounted on opposite sides of said turret, a shear blade secured to the upper end of each of said shafts, means for continuously rotating said turret, a vertically movable flanged member surrounding said sleeve, means for periodically raising said flanged member relative to said sleeve, and means engaging the flange on said member for turning said shafts and advancing said blades into the stream of glass to sever the same.

4. A shear mechanism for severing a continuously flowing stream of molten glass comprising a member adapted to rotate about an axis coinciding with the line of flow of the stream of glass, a pair of vertically extending shafts journaled in said member, a shear blade secured to the upper end of each shaft, means for rotating said member, and means for periodically advancing the shear blades into the stream of glass at a speed proportional to the speed of rotation of said member to produce successive symmetrical mold charges including a horizontal shaft geared to the lower end of each vertical shaft, an arm keyed to each horizontal shaft, and means for periodically actuating said arms.

5. A shear mechanism comprising a rotatable sleeve-like member, a pair of vertically extending blade carrying shafts journalled in said member and having helical threads on the lower ends thereof, a nut threaded on each of said shafts, means for continuously rotating said member, means for intermittently moving said shafts downwardly relative to said supporting member, and means for holding said nuts against rotation to impart a turning movement to said shafts and close said blades, said nut holding means being releasable on the continued downward movement of said shafts.

6. A shear mechanism comprising a rotatable sleeve-like member, vertically extending shafts journalled on opposite sides of said sleeve member, a shear blade secured to the upper end of each shaft, a nut threaded on the lower end of each shaft, means for continuously rotating said sleeve member, means for intermittently moving said shafts downwardly relative to said member, means for releasably holding said nuts against rotation during the major portion of the downward movement of such shafts to impart transverse and axial movement to the blades carried by said shafts, and means for returning said blades and shafts to their original position.

7. A shear mechanism comprising a turret member, a pair of vertically extending shafts journalled on said member, a shear blade secured to the upper end of said shaft, means for continuously rotating said turret member, means for intermittently moving said shafts downwardly relative to said turret member, means for turning said shafts as they move downwardly to close said blades, means for retracting said blades as the shafts approach the lower limit of their travel, and means for returning said shafts to their original position relative to said turret member.

8. A shear mechanism comprising a rotatable turret member, a pair of vertically extending shafts journalled on said member, a shear blade secured to the upper end of each shaft, means for continuously rotating said turret member, and means for intermittently turning said shafts to move the blades radially into cutting position including a shaft geared to the lower end of each vertical shaft, an arm secured to the free end of each last-mentioned shaft, and means for periodically raising and lowering said arms.

9. A shear mechanism comprising a rotatable turret member having its axis on the line of flow of a stream of molten glass, a pair of vertically extending shafts journalled on diametrically opposite sides of said turret member, a shear blade secured to the upper end of each shaft, a vertically movable track surrounding said turret member, means for continuously rotating said turret member, means for periodically raising said track relative to said turret member, and means cooperating with said track for imparting a turning movement to said shafts to move said blades into closed position.

10. A shear mechanism comprising a rotatable turret, shear blades carried by said turret, fluid actuated means for continuously rotating said turret, and means for periodically moving said blades into cutting relation with each other.

11. A shear mechanism comprising a rotatable turret sleeve, a pair of opposed shear blades carried by said turret sleeve, a fluid actuated turbine secured to said turret for rotating the same, a sleeve-like piston surrounding said turret sleeve, means for periodically actuating said piston, and means cooperating with said piston on movement thereof for moving said blades to closed position.

12. A shear mechanism for severing a flowing stream of molten glass comprising a rotatable turret sleeve, shear blades mounted on said turret, a member secured to the lower end of said sleeve, turbine blades on said member, means for directing fluid pressure against said turbine blades to rotate said member and said turret, means for moving said blades into cutting engagement with each other, means for concurrently moving said blades downwardly as they approach the cutting position, and means adapted to operate as said blades approach the end of their downward movement for opening said blades.

13. A shear mechanism for severing a stream of molten glass comprising a member adapted to rotate about an axis coinciding with the line of flow of said stream, shear blades carried by said member and movable to different vertical positions with relation thereto, means for continuously rotating said member, means for moving said blades vertically with relation to said member, means for moving said blades into cutting engagement with each other during vertical movement thereof, means adapted to operate as said blades approach the lower limit of their vertical movement for opening said blades, and means for yieldingly holding said blades in their open position.

14. A shear mechanism for severing a depending stream of molten glass comprising, a member mounted for rotation about the center of said stream, a pair of vertically extending threaded shafts carried by said member, a shear blade secured to the upper end of each shaft, a nut on the threaded portion of each shaft, means for releasably locking said nuts to said member, means for rotating said member, means for moving said shafts relative to said nuts to impart a combined axial and transverse movement to said shear blades and move the blades into closed position, means for retracting said blades, and means operable as said blades approach their lower limit of travel for releasing said nuts to permit said retracting means to open said blades.

15. A shear mechanism for severing a depending stream of molten glass comprising a rotatable turret, a pair of shafts journaled in said turret and movable relative thereto, a shear blade secured to each of said shafts, means for continuously rotating said turret, means for moving said shafts relative to said turret, means associated with said shafts for imparting a turning movement thereto when said shafts are moved relative to said turret to move the blades into cutting engagement with each other, means adapted to release said shaft turning means prior to the completion of the movement of the shafts relative to said turret, and means for retracting said blades operable on the release of said shaft turning means.

16. A shear mechanism comprising a rotatable turret, a pair of shear blades journaled on said turret, fluid actuated means for continuously rotating said turret, and fluid actuated means for periodically moving said blades into cutting engagement with each other including a sleeve-like piston having a flared skirt and a rocker arm secured to each said blade and bearing against said skirt.

17. A shear mechanism comprising a cylindrical support, a rotatable turret journaled on said support, a pair of shear blades journaled on said turret, turbine blades secured to said turret, means for directing actuating fluid against said turbine blades to rotate said turret, a sleeve-like piston slidable on said support, means associated with said piston for imparting a turning movement to said shear blades on movement thereof to cause the same to move into and out of cutting engagement, and means for periodically actuating said piston.

18. A method of severing a continuously flowing stream of molten glass into separate mold charges, which consists in rotating an instrument about such stream and in contact therewith, in moving such instrument into the mass of glass constituting the stream while continuing such rotation and while moving it with such stream, withdrawing said instrument from the stream while continuing the movement thereof with the stream and then moving it while so withdrawn in a direction opposite to the direction of travel of the stream.

19. A method of severing a continuously flowing stream of molten glass into individual mold charges which consists in rotating a cutting implement around said stream, periodically moving said rotating implement into cutting contact with such stream while causing the implement to travel with the stream, and withdrawing said implement from cutting engagement with said stream while continuing the movement thereof in the direction of flow of the stream.

20. A method of severing a continuously flowing stream of molten glass which consists in continuously rotating a pair of opposed shear blades around the stream, periodically moving said blades toward and across each other into the line of flow of said stream while causing said blades to travel downwardly with the direction of flow of the stream, retracting said blades while continuing the downward movement thereof, and then moving said blades upwardly in a direction opposite to the direction of flow of said stream.

21. A shear mechanism for severing a suspended stream of molten glass into individual mold charges comprising opposed shear blades, a vertical shaft for each of said blades, a rotatable turret on which said shafts are journaled, a member secured to said turret, turbine blades on said member, means for delivering fluid pressure to said blades to rotate said turret, and means for periodically moving said blades in cutting engagement with each other during the rotation of said turret including a flared sleeve surrounding said turret, means for moving said sleeve relative to said turret, and means secured to said shafts and cooperating with the flared portion of said sleeve for closing said blades on movement thereof in one direction.

22. A shear mechanism for severing a suspended stream of molten glass into individual mold charges comprising a cylindrical support, a turret sleeve rotatably mounted on said support, shear blades carried by said turret, fluid actuated means for continuously rotating said turret, and means for periodically moving said blades into cutting engagement during the rotation of said turret including a sleeve-like piston surrounding said support and movable relative thereto, and blade moving means operated by the movement of said piston.

FRANK L. O. WADSWORTH.